United States Patent Office 2,759,856
Patented Aug. 21, 1956

2,759,856

PREPARATION OF HIGH PURITY WOOD SUGARS

William A. Saums and William Schoen, Laurel, Miss., assignors to Masonite Corporation, Laurel, Miss., a corporation of Delaware No Drawing. Application November 5, 1952, Serial No. 318,954

4 Claims. (Cl. 127—37)

The present invention relates to the production of high purity wood sugars. More particularly, the invention relates to the conversion of hexose and pentose oligosaccharides to their corresponding monosaccharides. Even more particularly it relates to the production of such monosaccharides from liquors obtained by water washing thermohydrolytically treated lignocellulose.

In the manufacture of lignocellulose fiber boards, wood, woody materials obtained from corn stalks, cane, and other vegetable growths may be subjected to fibration and varying degrees of hydrolysis by treatment with steam. One such method is described in U. S. Patent No. 1,824,221 to Mason, issued September 22, 1931. In this method, relatively small wood chips are subjected to pressures of about 200–1200 p. s. i. at temperatures of about 200°–300° C. for approximately 30 seconds to 5 seconds, respectively, in the presence of steam. The woody material is then discharged from the treatment chamber through a constricted opening into a zone of lower pressure, thereby exploding the wood chips into comparatively finely divided elongated fibers and bundles of fibers. This thermohydrolytic treatment renders a portion of the wood water soluble while other fractions thereof become dispersible or suspendible in water. The water solubles, including those materials suspended or dispersed, are composed substantially of about 69–80% of hexosans and pentosans, 5–25% of lignin, 5–15% of non-sugar carbohydrates, and 2–8% of gums. Although these water soluble materials may be used in their crude condition for a number of purposes such as the preparation of adhesives and the like compositions, they are preferably concentrated before using. Concentrations of about 50–55% by weight of solids content are sold under the trademark "Masonex." However, for many purposes such as fermentation of the wood sugars to produce organic compounds such as acetone, butyl alcohol, acetic acid, and the like organic compounds, it is necessary to convert the sugar precursors, i. e. the hexosans and pentosans, to the corresponding reducing sugars and to remove substantially all of the suspended material as well as any dissolved material of a contaminating nature. The present invention provides a desirable method of preparing monosaccharides of high purity from the above described liquors.

Aqueous solutions of the above described character, and from which relatively all of the suspended material has been removed, have a dissolved solids content which consists almost entirely of carbohydrate material. There is a relatively small fraction present, about 5–15%, of monosaccharides consisting of mannose, arabinose, galactose, glucose, and xylose. The remainder of the dissolved solids consists of hexose and pentose oligosaccharides capable of conversion to the corresponding monosaccharides which are predominantly those named immediately above. Some of this carbohydrate material is capable of conversion to simple sugars by acid hydrolysis under atmospheric conditions. However, the yield of sugars and the purity thereof is not of commercial significance.

The art has heretofore suggested various methods of preparing wood sugars for fermentation purposes. All of these methods have involved some degree of hydrolysis followed by a number of so-called clarification treatments to remove contaminating and toxic components. Illustrative of such suggested procedures is that described and claimed in U. S. Patent No. 2,421,985 to Boehm et al. In that patent, the method includes hydrolysis of wood liquors, solvent extraction thereof, removal of solvent, treatment with calcium and sufide ions for precipitation of astringents and, finally, filtration of the liquors. Other previous methods uniformly include similar or equivalent clarification steps all of which are tedious, costly, and productive of low sugar yields. As a result, up to the present time there has been little commercial utilization of the vast quantities of wood sugars which are available for fermentation and the like purposes.

The primary object of the present invention is the provision of a simple and economical method of converting substantially all of the carbohydrate material present in the above described hexose and pentose oligosaccharide mixtures to the corresponding monosaccharides which consist principally of mannose, arabinose, galactose, glucose, and xylose.

Another object of the invention is the provision of a method of preparing high purity wood sugars wherein all of the previously necessary liquor clarification steps are eliminated. Other objects of the invention will be apparent from the following detailed description.

Briefly, the invention comprises filtering liquors obtained from hydrolyzed lignocellulose to remove therefrom substantially all suspended matter. The liquor is then subjected to acid hydrolysis under elevated temperatures and superatmospheric conditions for a period of time sufficient to convert the oligosaccharides to simple sugars but without causing degraduation thereof. The aqueous sugar solutions so obtained may be used per se for fermentation purposes, or they may be obtained in dry condition or substantially dry condition, or they may be recovered by adsorption, or chromatographic separation or other suitable means.

In carrying out the method of the invention the aqueous solution of hexose and pentose oligosaccharides is first heated at temperatures within the range of about 120°–150° C. and under the corresponding steam pressures. It has been found that the heat treatment should not exceed about 30–40 minutes duration in order to obtain the best yield and purity of sugars, and a preferred range of treatment is from about 18 to 30 minutes. Although any mineral acid will provide a suitable environment for the hydrolysis, sulfuric acid is preferred since it is more easily removed from the end product in the form of insoluble sulfates. The acidity of the hydrolysis medium is of a critical nature and has been found to be within the limits of about 3% to about 11.5% sulfuric acid concentration, based on the weight of oligosaccharide solution. Acidity greater than about 11.5% sulfuric acid concentration results in relatively low yields of low purity sugars. Acid concentrations lower than about 3% necessitates longer hydrolysis periods at higher temperatures and the resulting product is ordinarily of relatively low purity due to the longer exposure to acidic hydrolysis conditions.

Subsequent to the hydrolysis treatment, the free sulfuric acid is neutralized and it has been found that alkaline earth metal carbonates such as barium and calcium carbonates are most advantageously employed for this purpose. However, where the presence of soluble salts is of no great importance, alkali metal hydroxides may be used to neutralize the acid. On the other hand, alkaline earth metal hydroxides have been found to cause serious deterioration of the sugars and are therefore not suitable. Filtration of the neutralized mixture permits recovery of the mixture of the simple sugars, mannose, arabinose, galactose, glucose, and xylose. The mixed sugars are in every case more than about 85% pure. In this respect, the purity of the sugars as described herein, i. e. 85–100%, is actually a measurement of the reducing power thereof as compared with the reducing power of glucose since this means of evaluating sugars has long been accepted in the art. Inasmuch as the monosaccharides obtained contain simple sugars other than glucose, some of which have greater reducing power, it will be apparent that purities in excess of 100% are sometimes obtained. Where it is desired to remove all of the inorganic material, a small proportion of which may be present with the sugars, the treated sugar solution may be passed through an ion exchange resin bed. However, this treatment is not always necessary or preferable.

The invention will be described with greater particularity by the following specific examples. It is to be understood, however, that the examples are given for illustrative purpose only, the invention being limited only by the scope of the appended claims.

EXAMPLE 1

Individual aqueous solutions of hexose and pentose oligosaccharides obtained from hydrolyzed lignocellulose were filtered to remove substantially all suspended matter. Each of the solutions was then subjected to a temperature of 120°–133° C. in a small glass lined autoclave. Sulfuric acid in amounts sufficient to provide an acid concentration of from 3% to 11.5% was added to the aqueous solution prior to the hydrolysis thereof. The solutions were thereafter subjected to hydrolysis for periods of time ranging from a few minutes to about 30 minutes. Subsequent to the hydrolysis treatment the free acid was neutralized with alkaline earth carbonate and the mixture filtered. The sugars were then analyzed for purity and yield. The hydrolysis conditions and analytical data are set forth in the following table:

Table 1

| No. | Hydrolysis Temp., °C. | Hydrolysis Time, Min. | Acid Conc., Percent | Reducing Sugars Percent Yield | Reducing Sugars Percent Purity |
|---|---|---|---|---|---|
| 1 | 120 | 7.5 | 3 | 68.1 | 73.4 |
| 2 | 133 | 7.5 | 3 | 70.4 | 75.2 |
| 3 | 120 | 30 | 3 | 71.0 | 72.6 |
| 4 | 120 | 18 | 6 | 565.3 | 92.2 |
| 5 | 120 | 18 | 1.28 | 66.4 | 78.9 |
| 6 | 120 | 18 | 0.64 | 52.1 | 59.6 |
| 7 | 120 | 18 | 3 | 68.4 | 100.3 |
| 8 | 120 | 18 | 8.3 | 64.6 | 98.8 |
| 9 | 120 | 18 | 11.2 | 58.9 | 104.2 |
| 10 | 133 | 30 | 3 | 65.8 | 75.3 |
| 11 | 133 | 18 | 11.2 | 57.1 | 98.6 |

EXAMPLE 2

Individual solutions of hexose and pentose oligosaccharides obtained from hydrolyzed lignocellulose and containing 10% by weight of the sugars, 3% by weight of $H_2SO_4$, and the remainder water were subjected to hydrolysis under elevated temperatures and pressures in a pilot scale glass lined autoclave. Subsequent to the hydrolysis treatment, the free acid was neutralized by the addition thereto of barium carbonate. The precipitated material was then filtered off and the filtrate was analyzed for sugar purity. The following table sets forth the hydrolysis conditions and the analytical results obtained.

Table 2

| No. | Hydrolysis Temp., °C. | Hydrolysis Time, Min. | Percent Purity of Reducing Sugars |
|---|---|---|---|
| 1 | 126 | 20 | 69.8 |
| 2 | 126 | 30 | 87.15 |
| 3 | 126 | 40 | 85.8 |
| 4 | 134.5 | 20 | 85.6 |
| 5 | 134.5 | 30 | 89.6 |
| 6 | 134.5 | 40 | 89.15 |
| 7 | 141.4 | 20 | 92.35 |
| 8 | 141.4 | 30 | 92.6 |
| 9 | 141.4 | 40 | 90.85 |
| 10 | 148 | 20 | 85.7 |
| 11 | 148 | 30 | 88.9 |
| 12 | 148 | 40 | 82.25 |

From the results set forth in Table 2 it will be seen that one of the most desirable degrees of sugar purity was obtained at approximately 141° C. and over the entire hydrolysis period of from 20 minutes to 40 minutes at this temperature. In most instances, however, the purity of the sugar mixtures obtained was in excess of 85% and the entire temperature range of from 126° C. to about 148° C. is included within the scope of the present invention as is the hydrolysis treatment range of from about 20 minutes to about 40 minutes. All of these products are suitable for fermentation and for the recovery and separation of the respective monosaccharides.

From both of the foregoing examples and tables of results, it will be noted that a minimum hydrolysis treatment comprising about 18 minutes or slightly less at temperatures exceeding about 120° C., and in the presence of at least 3% of sulfuric acid, based on the weight of the sugar solution, is necessary in order to obtain sugar purities in excess of 85%. This relatively severe acid hydrolysis results in obtaining aqueous solutions of wood sugar mixtures which are thereafter capable of being fermented without further purification treatment.

The purified sugars obtained according to the above described method are, as has hereinbefore been stated, suitable for fermentation without further clarification. The novel method completely eliminates the necessity for solvent extraction, treatment with metal ions and hydrogen sulfide, and the like clarification treatments. Accordingly, the invention presents a considerable advance over the prior art methods of purifying wood sugars and this provides an economically feasible means of utilizing these presently wasted raw materials.

We claim:

1. Method of converting hexose and pentose oligosaccharides to the corresponding monosaccharides which comprises subjecting lignocellulose to hydrolysis at steam pressures of about 200–1200 p. s. i. for about 30–5 seconds, respectively, water washing the hydrolyzed lignocellulose, adding to the aqueous solution so-obtained sulfuric acid in an amount of about 3% to about 11.5% of the weight of the solution, heating the aqueous solution under superatmospheric pressure at a temperature within the range of about 120°–150° C. for a period of time within the range of about 18 to about 40 minutes, filtering the mixture, neutralizing the free sulfuric acid by the addition of an alkaline earth metal carbonate, and then filtering the mixture whereby there is obtained an aqueous solution containing principally mannose, arabinose, galactose, glucose, and xylose having a purity of more than about 85%.

2. Method of converting hexose and pentose oligosaccharides to the corresponding monosaccharides which comprises subjecting lignocellulose to hydrolysis at steam pressures of about 200–1200 p. s. i. for about 30–5 seconds, respectively, water washing the hydrolyzed lignocellulose, adding to the aqueous solution so-obtained sulfuric acid in an amount of about 3% to about 11.5% of the weight of the solution, heating the aqueous solution under superatmospheric pressure at a temperature within the range of about 120°–150° C. for a period of time within the range of about 18 to about 30 minutes, filtering the mixture, neutralizing the free sulfuric acid by the addition of an alkaline earth metal carbonate, and then filtering the mixture whereby there is obtained an aqueous solution containing principally mannose, arabinose, galactose, glucose, and xylose having a purity of more than about 85%.

3. Method of converting hexose and pentose oligosaccharides to the corresponding monosaccharides which comprises subjecting lignocellulose to hydrolysis at steam pressures of about 200–1200 p. s. i. for about 30–5 seconds, respectively, water washing the hydrolyzed lignocellulose, adding to the aqueous solution so-obtained sulfuric acid in an amount of about 3% to about 11.5% of the weight of the solution, heating the aqueous solution under superatmospheric pressure at a temperature within the range of about 120°–150° C. for a period of time within the range of about 18 to about 30 minutes, filtering the mixture, neutralizing the free sulfuric acid by the addition of barium carbonate, and then filtering the mixture whereby there is obtained an aqueous solution containing principally mannose, arabinose, galactose, glucose, and xylose having a purity of more than about 85%.

4. Method of converting hexose and pentose oligosaccharides to the corresponding monosaccharides which comprises subjecting lignocellulose to hydrolysis at steam pressures of about 200–1200 p. s. i. for about 30–5 seconds, respectively, water washing the hydrolyzed lignocellulose, adding to the aqueous solution so-obtained sulfuric acid in an amount of about 3% to about 11.5% of the weight of the solution, heating the aqueous solution under superatmospheric pressure at a temperature within the range of about 120°–150° C. for a period of time within the range of about 18 to about 30 minutes, filtering the mixture, neutralizing the free sulfuric acid by the addition of calcium carbonate, and then filtering the mixture whereby there is obtained an aqueous solution containing principally mannose, arabinose, galactose, glucose, and xylose having a purity of more than about 85%.

References Cited in the file of this patent

UNITED STATES PATENTS

| | | |
|---|---|---|
| 807,250 | Cross | Dec. 12, 1905 |
| 985,725 | Cohoe | Feb. 28, 1911 |
| 1,091,327 | Gallagher | Mar. 24, 1914 |
| 1,806,531 | Gogarten | May 19, 1931 |

FOREIGN PATENTS

| | | |
|---|---|---|
| 348,740 | Great Britain | May 21, 1931 |
| 579,116 | Great Britain | July 24, 1946 |